United States Patent [19]
Polydoris et al.

[11] Patent Number: 5,121,368
[45] Date of Patent: Jun. 9, 1992

[54] ENGINE OPERATING TIME MEASURING APPARATUS

[75] Inventors: Nicholas G. Polydoris, Wilmette; Paul Mitchell, Glenview; Stanislaw Kocol; James George, both of Chicago; Stan Mazulis, Wildwood, all of Ill.

[73] Assignee: ENM Company, Chicago, Ill.

[21] Appl. No.: 657,513

[22] Filed: Feb. 19, 1991

[51] Int. Cl.⁵ .................................. G04F 8/00
[52] U.S. Cl. ....................... 368/9; 368/276; 368/8
[58] Field of Search ............ 368/80, 97, 178, 228, 368/238, 281, 34, 36, 35, 37, 276

[56] References Cited

U.S. PATENT DOCUMENTS

| | | | |
|---|---|---|---|
| 1,446,613 | 2/1923 | Bush | 368/8 |
| 1,458,509 | 6/1923 | Arthur | 368/8 |
| 1,585,806 | 5/1926 | Watson | 368/8 |
| 2,031,945 | 2/1936 | Glunt | 368/8 |
| 2,051,502 | 8/1936 | Siggert et al. | 368/8 |
| 2,173,853 | 9/1939 | Naeker et al. | 368/8 |
| 2,294,031 | 8/1942 | Hobbs et al. | 368/8 |
| 2,533,638 | 12/1950 | Thornton-Norris | 368/8 |
| 3,182,440 | 5/1965 | Widegren . | |
| 3,256,685 | 6/1966 | Siewert . | |
| 3,299,627 | 1/1967 | Hart et al. . | |
| 3,479,815 | 11/1969 | Prindell, Jr. et al. . | |
| 3,792,445 | 2/1974 | Bucks et al. . | |
| 3,854,281 | 12/1974 | Reichert . | |
| 3,948,039 | 4/1976 | Leveraus . | |
| 3,965,669 | 6/1976 | Larson et al. . | |
| 4,049,952 | 9/1977 | Forsslund . | |
| 4,180,724 | 12/1979 | Councilman et al. . | |
| 4,277,941 | 7/1981 | Ogden | 368/8 |
| 4,395,624 | 7/1983 | Wartski . | |
| 4,478,521 | 10/1984 | Evans et al. . | |
| 4,501,005 | 2/1985 | Miller . | |
| 4,534,045 | 8/1985 | Collier . | |
| 4,612,655 | 9/1986 | Nakamura . | |
| 4,630,292 | 12/1986 | Juricich et al. . | |
| 4,937,798 | 6/1990 | Zepf | 368/8 |
| 4,941,139 | 7/1990 | Breitung | 368/8 |
| 4,985,875 | 1/1991 | Mitchell . | |

Primary Examiner—Bernard Roskoski
Attorney, Agent, or Firm—Mason, Kolehmainen, Rathburn & Wyss

[57] ABSTRACT

An engine operating time measuring apparatus is provided for use with an engine having an internal magneto-type electrical generator providing an ignition voltage. The engine operating time measuring apparatus includes a housing and a pair of terminals extending outside the housing for connection with the monitored engine and extending inside the housing for connection with the time measuring apparatus. A subassembly including power supply circuitry, a clock movement drive assembly, gear train and mechanical counter for displaying the engine operating time is accurately positioned and retained in the housing cooperatively provided by a counter frame and a plurality of keying and positioning rails formed within the housing. A low torque clock movement for driving the mechanical counter is generated by a crystal-based clock motor movement assembly.

16 Claims, 3 Drawing Sheets

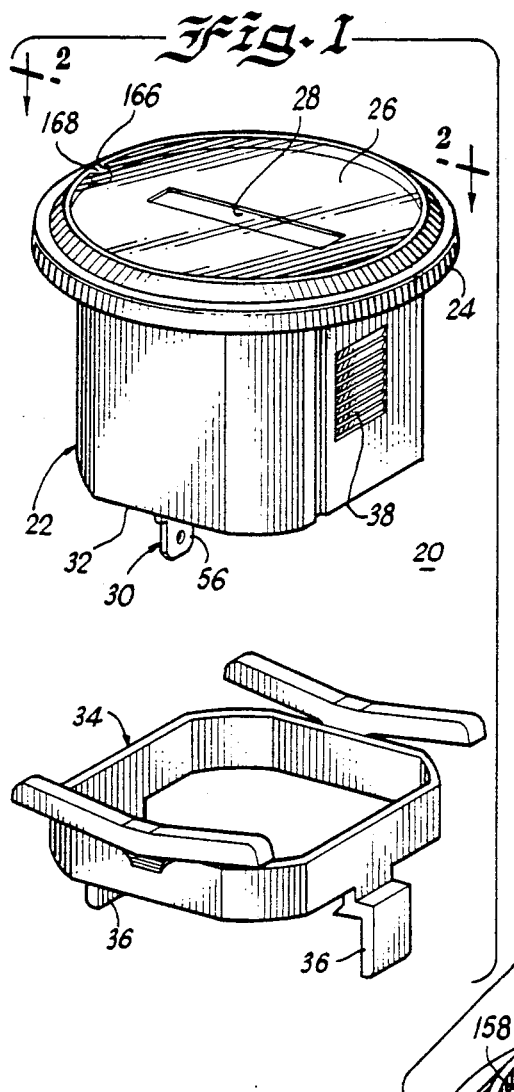
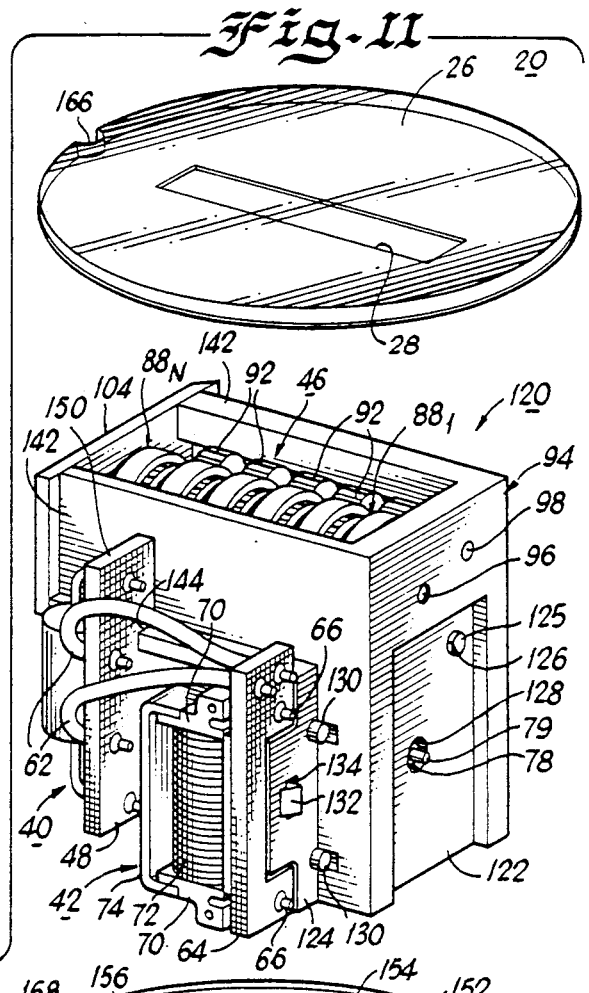
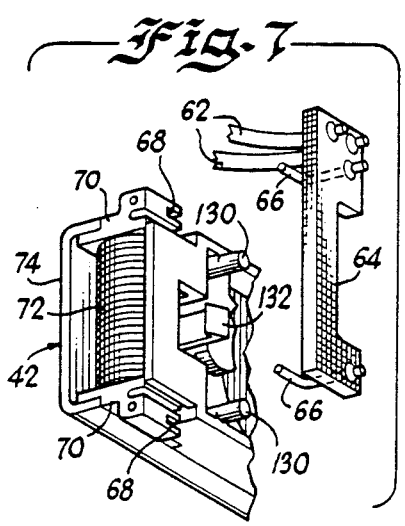
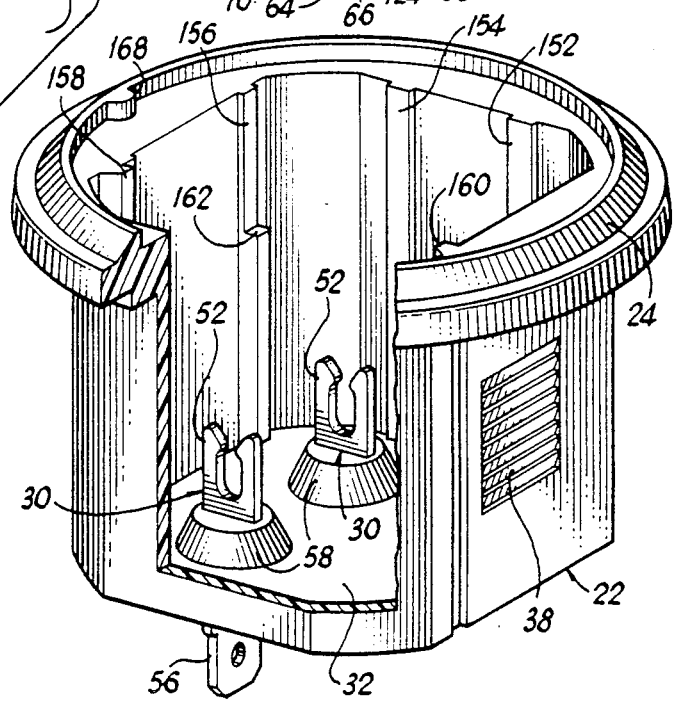

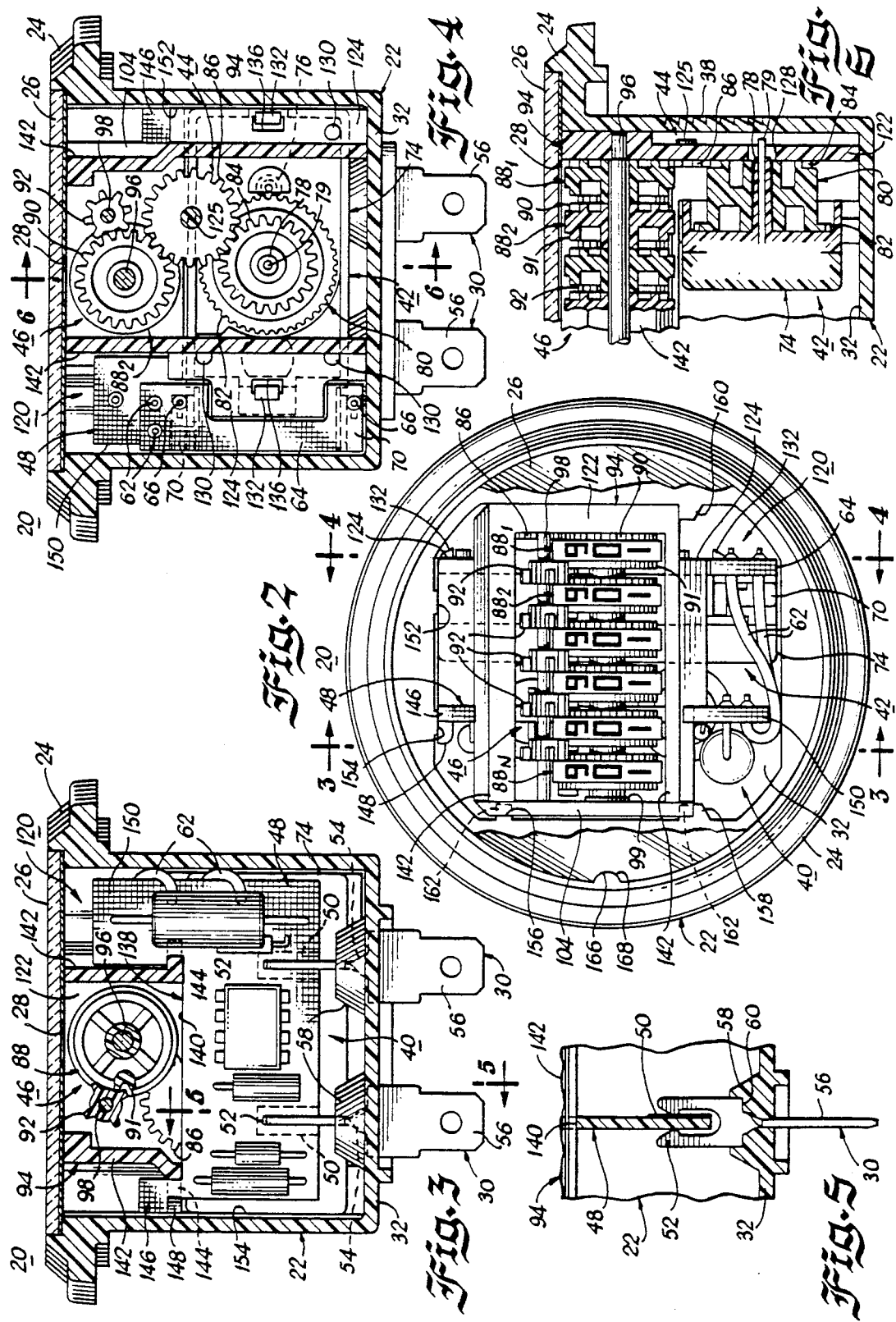

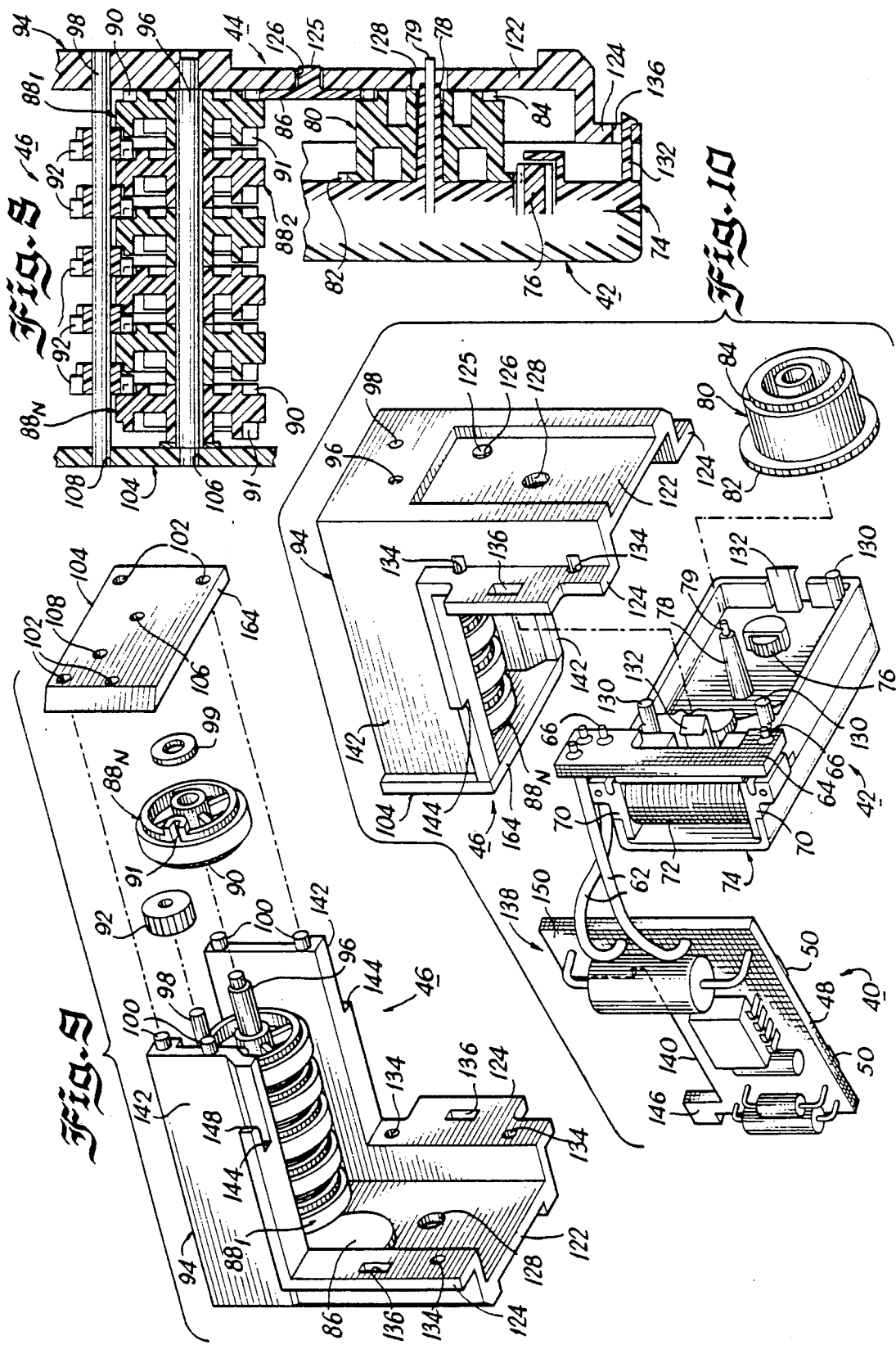

5,121,368

ENGINE OPERATING TIME MEASURING APPARATUS

BACKGROUND OF THE INVENTION

1. Field of the Invention

The present invention relates to hour meters for recording the operating time of monitored engines, and more particularly to an engine operating time recording apparatus of the type including a mechanical counter.

2. Description of the Prior Art

Hour meters are commonly used to measure the running or operating time of various equipment for scheduling preventive maintenance. Disadvantages of known mechanical hour meters include the imprecise recording of time and unreliability. Many digital and electromechanical hour meters have the same disadvantages and also can be used for limited applications due to the power source requirements.

An hour meter that overcomes many of the disadvantages of the prior art is disclosed in U.S. Pat. No. 4,985,875 issued Jan. 15, 1991 to Paul Mitchell and assigned to the present assignee. The disclosed engine operating time hour meter is particularly useful for recording the operating time of small engines being completely powered by an internal magneto-type electrical generator of a monitored engine. Further, the disclosed engine operating time hour meter includes a mechanical counter and is reliable and accurate.

It is desirable to provide an hour meter that is reliable and accurate while having a simple and efficient arrangement that is inexpensive to manufacture.

SUMMARY OF THE INVENTION

Among the important objects of the present invention are to provide an improved hour meter for recording the operating time of a monitored engine; to provide such an hour meter that is a simple arrangement and economical to manufacture; and to provide such an hour meter that overcomes many of the disadvantages of known hour meters.

In brief, the objects and advantages of the present invention are achieved by an engine operating time measuring apparatus for use with an engine. The engine operating time measuring apparatus includes a housing defining a cavity and a pair of terminals extending outside the housing for electrical connection with a monitored engine and extending inside the housing for electrical connection with a printed wiring board carrying a power supply circuit for supplying operating power when the monitored engine is operating. A clock movement motor assembly is responsive to the supplied operating power for generating a clock torque movement. The clock movement motor assembly includes a case having positioning and locking members. The clock movement motor assembly includes a drive gear coupling the generated clock torque movement. A mechanical counter assembly contained within the housing indicates the engine operating time. The mechanical counter assembly includes a frame having structure cooperating with the positioning and locking members for positioning and locking the clock movement assembly with the counter frame. The mechanical counter assembly includes a plurality of numbered wheels, each numbered wheel having opposed gear surfaces. A drive train assembly contained within the housing drivingly connects the generated clock torque movement to the mechanical counter assembly. The drive train assembly is operatively captured between the frame and the clock movement drive gear and a first one of the plurality of numbered wheels.

In accordance with a feature of the invention, when the monitored engine is operating, the mechanical counter wheels of the hour meter are driven by a low torque clock movement generated by a crystal-based clock motor movement assembly of the type used in clocks having moving hands.

BRIEF DESCRIPTION OF THE DRAWINGS

The present invention together with the above and other objects and advantages may best be understood from the following detailed description of the embodiment of the invention illustrated in the drawings, wherein:

FIG. 1 is a perspective view of an engine powered hour meter arranged in accordance with the invention together with a spring clip for mounting the hour meter for monitoring an engine;

FIG. 2 is a plan view, partially broken away of the engine powered hour meter taken along the line 2—2 of FIG. 1;

FIG. 3 is a cross-sectional view of the engine powered hour meter taken along the line 3—3 of FIG. 2;

FIG. 4 is a cross-sectional view of the engine powered hour meter taken along the line 4—4 of FIG. 2;

FIG. 5 is a cross-sectional view of the engine powered hour meter taken along the line 5—5 of FIG. 3;

FIG. 6 is a cross-sectional view of the engine powered hour meter taken along the line 6—6 of FIG. 4;

FIG. 7 is a fragmentary perspective view illustrating an electrical connection of a clock drive power supply circuit to a clock movement motor assembly of the engine powered hour meter of FIG. 1;

FIG. 8 illustrates a gear train and a mechanical counter assembly of the clock movement drive assembly of the engine powered hour meter of FIG. 1;

FIG. 9 is a perspective view illustrating a mechanical counter assembly of the engine powered hour meter of FIG. 1;

FIG. 10 is an exploded perspective view illustrating a subassembly of the engine powered hour meter of FIG. 1; and FIG. 11 is an exploded perspective view illustrating the subassembly with a housing of the engine powered hour meter of FIG. 1.

DETAILED DESCRIPTION OF THE PREFERRED EMBODIMENT

Referring now to the drawings, in FIGS. 1-11 there is illustrated an engine powered hour meter for monitoring an engine (not shown) arranged in accordance with the principles of the present invention and designated as a whole by the reference character 20. As shown, hour meter 20 includes a generally rectangular housing body 22 having an generally circular, open flanged portion 24. A face or dial plate 26 having a transparent viewing window 28 is secured to the flanged housing portion 24. A pair of terminals 30 for providing an electrical connection to the monitored engine extend through a housing wall 32 opposite the dial plate 26.

Hour meter 20 is shown together with a unitary spring clip 34 having a pair of spring arms 36 that engage opposed ribbed housing body portions 38 (one shown) for releasable mounting of the hour meter within an opening of a panel or the like near the monitored engine. It should be understood that the illustrated housing 22 and mounting arrangement of the hour meter 20 are exemplary only. Various other configurations and mounting arrangements can be provided in accordance with features of the invention.

Among its primary components, the hour meter 20 includes a clock drive power supply circuit 40, a clock movement motor assembly 42, a gear train 44 and a mechanical counter assembly 46. Electrical clock drive operating power for the hour meter 20 is provided by the clock drive power supply circuit 40 only when the monitored engine is operating. The clock movement motor assembly 42 provides a low torque clock movement or counter drive output in response to an applied voltage output of the power supply circuit 40. Mechanical counter 46 is operatively driven by the clock movement motor assembly 42 via the gear train assembly 44 best seen in FIGS. 4, 6, 8 and 10.

Although it should be understood that the engine powered hour meter 20 can be used for various applications, operating power advantageously is completely derived from any monitored engine having an internal magneto-type electrical generator. Such an operating power supply circuit and oscillator circuit advantageously used for the power supply circuit 40 is disclosed by the above-described U.S. Pat. No. 4,985,875. The disclosure of U.S. Pat. No. 4,985,875 is incorporated herein by reference.

Referring to FIGS. 2-4, power supply circuit 40 is carried by a printed wiring board 48 having a pair of spaced apart electrical contact portions 50 for mechanical and electrical engagement with internal spring clip portions 52 of the terminals 30.

As best seen in FIGS. 3 and 5, a generally central portion 54 of the terminals 30 is twisted to orthogonally rotate the spring clip portion 52 with respect to an external blade terminal portion 56. The housing 22 is formed, for example, by injection molding with the terminals 30 located in place at predetermined positions. Terminals 30 are retained within a pair of upstanding housing portions 58 of the housing wall 32. Opposed flat surfaces 60 and the twisted portion 54 of the terminals 30 define stops with the housing portions 58 to avoid pull-out of the terminals from the housing 22.

Electrical clock drive operating power is applied to the clock movement motor assembly 42 from the circuit 40 via a pair of insulated conductors or wires 62 soldered to both the printed wiring board 48 and a second printed wiring board 64.

Referring also to FIG. 7, a pair of generally L-shaped electrically conductive pins 66 are connected to the wires 62 by a soldered connection to the second printed wiring board 64. An aperture 68 is provided in each of a pair of opposed winding support members 70 supporting a electromagnetic coil or winding 72 for receiving the L-shaped pins 66. The clock drive operating power signal is applied to the opposed ends of the winding 72 via the pins 66.

Pulse train signals are alternately applied to the opposed ends of the winding 72, for example, such as, with each pulse train including 46.9 millisecond pulses separated by 2 seconds so that alternate 46.9 millisecond pulses separated by 1 second are sequentially applied to the opposed winding ends resulting in the low torque counter drive output of the clock movement motor assembly 42.

In accordance with a feature of the invention, the clock movement motor assembly 42 preferably is a conventional crystal-based clock movement motor assembly commonly used in clocks and/or watches having moving hands, manufactured and sold by various manufacturers. For example, a quartz crystal clock movement motor assembly Model W100.2, Part No. 901655 manufactured and sold by Hechinger of Schwenninger, Federal Republic of Germany can be used for the clock movement motor assembly 42.

In FIGS. 4 and 6, the gear train assembly 44 and a plastic case 74 of the clock movement motor assembly 42 are shown. The gear train assembly 44 is operatively driven by an output drive gear 76 of the clock movement motor assembly 42. A minute drive gear of the clock movement motor assembly 42 can be used for the output drive gear 76. An upstanding case socket 78 surrounding a clock output shaft 79 that is not used, positions and supports a double gear 80 of the drive train 44. Referring also to FIG. 10, double gear 80 includes a first gear surface 82 that engages the drive gear 76 and a second gear surface 84 that engages an idler gear 86. Output drive gear 76 of the clock movement motor assembly 42 and the doubler and idler gears 80 and 86 preferably are formed of a synthetic resin or plastic material having sufficient durability and strength and being light-weight.

Idler gear 86 directly drives the counter 46 that includes a plurality of dial display elements or numbered wheels $88_1$–$88_N$, together indicative of cumulative operating time for the monitored engine. Each numbered wheel $88_1$–$88_N$ includes opposed gear surfaces 90 and 91 adapted for engaging a pinion 92 disposed between the numbered wheels. Pinions 92 couple the drive movement applied to the counter assembly 46 by the idler gear 86 to sequential wheels $88_1$–$88_N$. Numbered wheels $88_1$–$88_N$ and the cooperating pinions 92 are light-weight plastic members that easily rotate by incremental steps in response to a very low torque output of the clock movement output gear 76 via the gear train 44.

For example, each incremental movement of the dial display wheel $88_1$ can indicate 1/10 hour, the dial display wheel $88_2$ indicating 1 hour increments and being incremented one time after 10 increments or one complete rotation of the first display wheel $88_1$. This action continues for each of the sequential dial display wheels through display wheel $88_N$ included in the counter assembly 46 via the cooperation of the gears 90 and pinions 92.

Referring to FIGS. 8 and 9, the counter assembly 46 includes a plastic counter frame 94 supporting a first rod 96 for positioning and rotatably mounting the display wheels $88_1$–$88_N$ and a second rod 98 for positioning and rotatably mounting the pinions 92. During assembly of the counter assembly 46, the display wheels $88_1$–$88_N$ are sequentially installed on wheel rod 96, each followed by mounting one pinion 92 on the pinion rod 98. A washer 99 is mounted on wheel rod 96 located adjacent to the display wheels $88_N$ for positioning the display wheels $88_1$–$88_N$. Four counter frame posts 100 are received within corresponding aligned apertures 102 in an end plate 104. Wheel rod 96 and pinion rod 98 are received within corresponding end plate apertures 106 and 108, respectively. The end plate 104 is secured by press-fit engagement with the posts 100 of the counter frame 94 and rods 96 and 98 to complete the counter assembly 46.

Referring now to FIGS. 10 and 11, a subassembly generally designated by 120 includes the power supply circuit 40, clock movement motor assembly 42, gear train 44 and mechanical counter assembly 46 assembled together. In accordance with an important aspect of the present invention, the subassembly 120 is simple in construction and facilitates easy assembly of the hour meter 20 with the subassembly 120 inserted into the housing 22 for reliable and effective operation of the hour meter.

Referring also to FIG. 9, the counter frame 94 includes a recessed wall portion 122 between a pair of inwardly extending flange portions 124. Idler 86 includes an arbor 124 received and retained within a corresponding aligned aperture 126 of the counter frame wall portion 122. When assembled, the double gear 80 mounted on the upstanding case socket 78 is aligned with a corresponding aperture 128 providing passage for the socket 78 surrounding shaft 79. Three posts 130 and a pair of upstanding fingers 132 formed on the clock movement case 74 and corresponding aligned apertures 134 and 136, respectively, in the counter frame flange portions 124 cooperate to position and lock the clock movement assembly 42 with the counter assembly 46. Idler 86 is captured between the double gear surface 84 and gear surface 91 of the counter wheel 88₁ and the counter frame wall portion 122.

A mating face 138 of the printed wiring board 48 includes a cutout portion 140 that is slidingly received along opposed counter frame wall portions 142 until engaging a recessed stop surface or ledge 144 of the counter frame 94. An upstanding tab 146 of the mating face 138 is received and retained between a corresponding retaining counter frame wall portion 148 and wall portion 142 to position the printed wiring board 48. An opposite, undercut tab 150 of the mating face 138 engages the opposed counter frame wall portion 142 additionally for positioning of the printed wiring board 48.

As best seen in FIG. 11 accurate positioning of the subassembly 120 within the housing 22 is cooperatively provided by the counter frame 94 and a plurality of keying and positioning rails 152, 154, 156, 158 and 160 formed within the housing 22. An inwardly extending stop surface 162 is formed in keying and positioning rails 156 and 158 for engagement with a lower surface 164 of the counter frame end plate 104 additionally for accurately positioning the printed wiring board contact portions 50 within the spring clip portions 52 of the terminals 30.

Alignment of the transparent viewing window 28 of the dial plate 26 and the counter display wheels 88 is provided by a registration notch 166 in the dial plate and a corresponding mating registration surface 168 formed within the open flanged portion 24 of the housing 22. Assembly of the hour meter 20 is completed by securing the dial plate 26 to the open flanged portion 24 of the housing 22, for example by ultrasonic welding to seal the hour meter 20.

While the invention has been described with reference to details of the illustrated embodiment, these details are not intended to limit the scope of the invention as defined in the appended claims.

We claim:

1. An engine operating time measuring apparatus comprising:

a housing defining a cavity;

terminal means; said a printed wiring board carrying a power supply circuit, terminal means extending outside said housing for electrical connection with a monitored engine; said terminal means extending inside said housing for electrical connection with said printed wiring board supplying operating power when the monitored engine is operating;

said printed wiring board having a pair of electrical contacts formed on said printed wiring board; said pair of electrical contacts being spaced apart and aligned for electrical engagement with said terminal means;

clock movement means contained within said housing responsive to said operating power supplying means for generating a clock torque movement; said clock movement means including a case having positioning and locking members and a crystal-based clock movement motor means carried by said case and having a drive gear coupling said generated clock torque movement;

mechanical counter means contained within said housing for indicating the engine operating time; said mechanical counter means including a frame having means for cooperating with said positioning and locking members for positioning and locking said clock movement means with said counter frame and said mechanical counter means including a plurality of numbered wheels, each numbered wheel having opposed gear surfaces; and drive train means contained within said housing drivingly connected to said mechanical counter means for coupling said generated clock torque movement to said mechanical counter means; said drive coupling means operatively captured between said frame and said clock movement drive gear and a first one of said plurality of numbered wheels.

2. An engine operating time measuring apparatus as recited in claim 1 wherein said operating power supplying means, said clock movement means, said counter means and said drive coupling means are assembled together to form a subassembly; and wherein said housing includes keying and positioning means cooperating with said counter frame for accurately aligning and positioning said subassembly within said housing; and further including a dial plate fixedly secured to said housing, said dial plate having a viewing window and said counter means indicating the engine operating time through said viewing window.

3. An engine operating time measuring apparatus as recited in claim 1 wherein drive train means adjust the frequency of said generated clock torque movement applied to said mechanical counter means.

4. An engine operating time measuring apparatus as recited in claim 3 wherein drive train means include a double gear and an idler gear.

5. An engine operating time measuring apparatus as recited in claim 1 wherein said clock movement means is a quartz crystal-based clock motor assembly of the type used in clocks having moving hands.

6. An engine operating time measuring apparatus as recited in claim 1 wherein said terminal means include a blade portion extending outside said housing for electrical connection with a monitored engine.

7. An engine operating time measuring apparatus as recited in claim 1 wherein said terminal means include a spring clip portion extending inside said housing for electrical connection with a printed wiring board carrying a power supply circuit for supplying operating power when the monitored engine is operating.

8. An engine operating time measuring apparatus as recited in claim 7 further including a generally central twisted terminal portion to orthagonally rotate said spring clip portion from said blade portion and cooperating with said housing for positioning and retaining said terminal means with said housing.

9. An engine operating time measuring apparatus as recited in claim 1 wherein said housing is formed by injection molding with said terminal means set in place at predetermined positions.

10. An engine operating time measuring apparatus as recited in claim 2 wherein said dial plate and housing further include cooperating registration means for orienting said viewing window with said counter means.

11. An engine operating time measuring apparatus as recited in claim 4 wherein said clock movement case includes a support member for rotatably mounting said double gear.

12. An engine operating time measuring apparatus as recited in claim 4 wherein said idler gear includes an arbor rotatably received in said counter frame and said idler gear operatively engaging both said double gear and said first one of said plurality of numbered wheels.

13. An engine operating time measuring apparatus as recited in claim 2 wherein said housing includes a plurality of keying and positioning rails formed within the housing cooperating with said counter frame for accurately positioning and retaining said subassembly in said housing.

14. An engine operating time measuring apparatus as recited in claim 13 wherein a stop surface is defined in at least one of said keying and positioning rails for accurately positioning a pair of electrical contacts formed on said printed wiring board with said terminal means.

15. An engine operating time measuring apparatus comprising:

a housing defining a cavity;

terminals means; said terminals means extending outside said housing for electrical connection with a monitored engine; said terminal means extending inside said housing for electrical connection with a printed wiring board carrying a power supply circuit for supplying operating power when the monitored engine is operating;

clock movement means contained within said housing responsive to said operating power supplying means for generating a clock torque movement; said clock movement means including a case having positioning and locking members and a crystal-based clock movement motor assembly carried by said case and having a drive gear coupling said generated clock torque movement;

mechanical counter means contained within said housing for indicating the engine operating time; said mechanical counter means including a frame having means for cooperating with said positioning and locking members for positioning and locking said clock movement means with said counter frame and said mechanical counter means including a plurality of numbered wheels; each numbered wheel having opposed gear surfaces;

drive train means contained within said housing drivingly connected to said mechanical counter means for coupling said generated clock torque movement to said mechanical counter means; said drive coupling means operatively captured between said frame and said clock movement drive gear and a first one of said plurality of numbered wheels;

said operating power supplying means, said clock movement means, said counter means and said drive coupling means being assembled together to form a subassembly; and said housing including keying and positioning means cooperating with said counter frame for accurately aligning and positioning said subassembly within said housing; and a dial plate fixedly secured to said housing, said counter means indicating the engine operating time through said dial plate.

16. An engine operating time measuring apparatus comprising:

a housing defining a cavity;

terminal means; said a printed wiring board carrying a power supply circuit, terminal means extending outside said housing for electrical connection with a monitored engine; said terminal means extending inside said housing for electrical connection with said printed wiring board supplying operating power when the monitored engine is operating;

said printed wiring board having a pair of electrical contacts formed on said printed wiring board; said pair of electrical contacts being spaced apart and aligned for electrical engagement with said terminal means;

clock movement means contained within said housing responsive to said operating power supplying means for generating a clock torque movement; said clock movement means including a case having positioning and locking members and a crystal-based clock movement motor means carried by said case and having a drive gear coupling said generated clock torque movement;

mechanical counter means contained within said housing for indicating the engine operating time; said mechanical counter means including a frame having means for cooperating with said positioning and locking members for positioning and locking said clock movement means with said counter frame and said mechanical counter means including a plurality of numbered wheels; each numbered wheel having opposed gear surfaces;

drive train means contained within said housing drivingly connected to said mechanical counter means for coupling said generated clock torque movement to said mechanical counter means; said drive coupling means operatively captured between said frame and said clock movement drive gear and a first one of said plurality of numbered wheels;

said operating power supplying means, said clock movement means, said counter means and said drive coupling means being assembled together to form a subassembly;

a dial plate fixedly secured to said housing, said dial plate having a viewing window and said counter means indicating the engine operating time through said viewing window;

said housing including a plurality of keying and positioning rails formed within the housing cooperating with said counter frame for accurately positioning and retaining said subassembly in said housing; and a stop surface defined in at least one of said keying and positioning rails for accurately positioning said pair of electrical contacts formed on said printed wiring board with said terminal means.

* * * * *

UNITED STATES PATENT AND TRADEMARK OFFICE
CERTIFICATE OF CORRECTION

PATENT NO.  :  5,121,368
DATED       :  June 9, 1992
INVENTOR(S) :  Nicholas G. Polydoris, et al It is certified that error appears in the above-identified patent and that said Letters Patent is hereby corrected as shown below:

Col. 5, after line 63, insert --a printed wiring board carrying a power supply circuit,--;

Col. 5, lines 64-65, delete "a printed wiring board carrying a power supply circuit,";

Col. 8, after line 12, insert --a printed wiring board carrying a power supply circuit,--;

Col. 8, lines 13-14, delete "a printed wiring board carrying a power supply circuit,".

Signed and Sealed this

Twentieth Day of July, 1993

Attest:

MICHAEL K. KIRK

*Attesting Officer*   Acting Commissioner of Patents and Trademarks